United States Patent [19]

Raftery

[11] Patent Number: 4,700,430
[45] Date of Patent: Oct. 20, 1987

[54] FURNITURE SUPPORT

[76] Inventor: William Raftery, 3101 Bridlegate Dr., Arlington, Tex. 76016

[21] Appl. No.: 763,820

[22] Filed: Aug. 7, 1985

[51] Int. Cl.$^4$ .................. B60B 33/00; A47B 91/06
[52] U.S. Cl. .................. 16/18 CG; 16/42 R; 16/18 R
[58] Field of Search ............... 16/18 R, 18 CG, 18 B, 16/31 R, 31 A, 40, 42 R

[56] References Cited
U.S. PATENT DOCUMENTS

| D. 2,710 | 7/1867 | Howard | D8/375 |
|---|---|---|---|
| D. 176,617 | 1/1956 | Kramcsak | D8/374 |
| 222,180 | 12/1879 | Cutting . | |
| 313,097 | 3/1885 | Michelson . | |
| 664,798 | 12/1900 | Weidman | 16/32 |
| 672,138 | 4/1901 | Stockwell . | |
| 1,332,605 | 3/1920 | Child | 16/42 |
| 1,891,643 | 12/1932 | Henrickson | 248/188.9 |
| 2,613,389 | 10/1952 | Cramer | 248/188.9 |
| 2,717,410 | 9/1955 | Holloman | 16/42 R |
| 2,842,417 | 7/1958 | Scanlon . | |
| 3,080,601 | 3/1963 | Kramcsak | 248/188.9 |
| 3,430,287 | 2/1967 | Schroeder | 16/42 |
| 3,601,345 | 8/1971 | Johnson | 248/188.9 |
| 3,884,495 | 5/1975 | Petock . | |
| 4,138,763 | 2/1979 | Cooley | 248/188.8 |

Primary Examiner—Frederick R. Schmidt
Assistant Examiner—Maurina Rachuba
Attorney, Agent, or Firm—Alexander, Unikel, Bloom, Zalewa & Tenenbaum, Ltd.

[57] ABSTRACT

A support for an article of furniture is readily interchangeable between having a glide exposed to the ground and a caster exposed to the ground with the glide being stored within a shroud. The furniture remains level in either embodiment since the total length of the support will stay the same. Minor adjustments in the length of the support are made by rotating the shroud.

4 Claims, 5 Drawing Figures

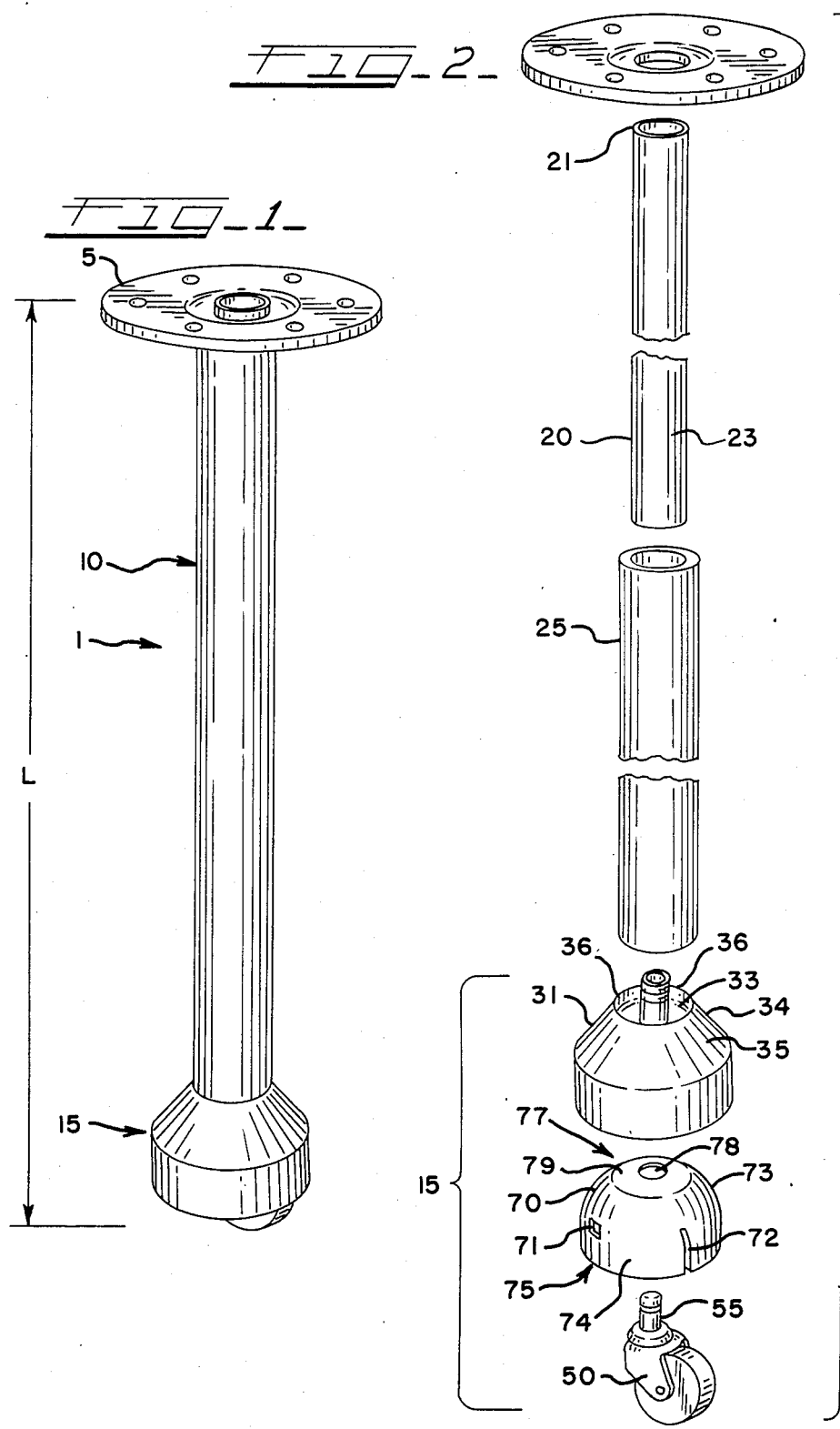

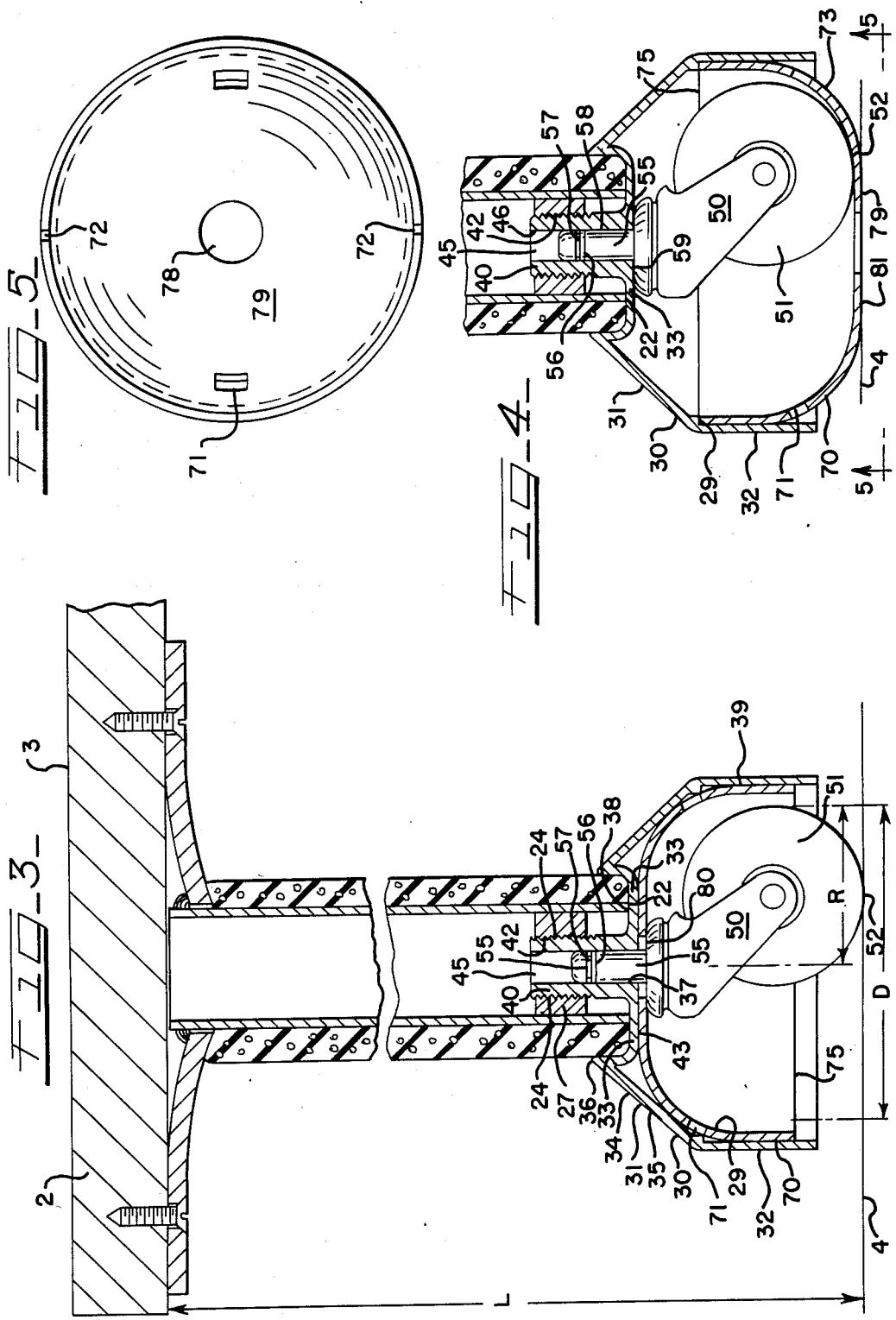

4,700,430

FURNITURE SUPPORT

FIELD OF INVENTION

This invention relates to a convertible support for an article of furniture that allows either rolling movement of the furniture by means of a caster when the caster is exposed to the floor or stationary support for the furniture when a glide surface is exposed to the floor.

One of the objects of the present invention is to allow for a quick change from an exposed caster to an exposed glide with the use of a minimum amount of tools and while maintaining the top surface of the article of furniture level when either the caster or glide is exposed. Thus, for instance, a four legged table could be constructed with two legs at one end having exposed casters and two legs at the other end having exposed glides. The table could easily be rolled to a new location by merely picking up the end of the table with the legs containing the glides and pushing the table to the new location.

Another object of the invention is to create a furniture leg that has a pleasing appearance by shielding the caster from the immediate view of persons sitting near or working around the article of furniture. This shielding should also act to protect the caster from physical abuse, such as being kicked. Another object of the invention is to allow a space for storage of the glide when the glide is not exposed so that it is readily available for use at any time. It is also an object of this invention to make the bottom surface of the glide large enough to not put indentations in the floor covering.

Still another object of the present invention is to provide a furniture leg that is padded to protect human legs and surrounding furniture. Preferably, this padded sleeve may be loosely applied to the leg so that it can rotate when struck by a glancing blow, thus reducing the chances that the padding will be cut by the item striking it. Also, since the foot is easily screwed on or off the leg, the padded sleeve is easily slid on or off of the leg in order to easily change the exterior appearance of the leg. Other objects of the present invention include constructing a table leg that is inexpensive yet sturdy and easy to level on an uneven floor surface without the necessity of picking up the table.

Other objects and a fuller understanding of my invention may be obtained by referring to the following description and claims taken in conjunction with the accompanying drawings.

DESCRIPTION OF THE PRIOR ART

Furniture supports with ends containing casters to allow rolling movement of the furniture are old and well known in the art. It is also well known to adapt a skirt over the caster to remove the caster from view.

U.S. Pat. No. 222,180 shows a stove-leg with a caster on the bottom to allow rolling movement of the stove when the caster is in contact with the floor. The stove can also be made stationary by lifting the stove and the leg and inserting the end of the leg into an annular pedestal.

U.S. Pat. No. 2,613,389 discloses a combined hemispherical cup and spring supported caster. This patent describes a piece of furniture that will be allowed to roll on the caster when there is little or no weight on the furniture allowing the spring to be extended lifting the cup around the caster off the floor. When weight is placed on the device, the spring collapses and the weight of the device is supported by the hemispherical cover creating a stationary piece of furniture.

Also of interest is U.S. Pat. No. 4,138,763 which discloses a removable attachment for a caster to eliminate the rollability of the caster.

These prior art devices, either singularly or taken together, do not achieve the beneficial results of the applicant's invention. In every case, the level of the article of furniture is altered when furniture is changed from its rollable mode to the fixed mode. Thus, combinations of casters and glides are impractical. Moreover, there is no storage provision for the stationing device in either the '180 patent or the '763 patent.

Furniture glides are also well known in the prior art. However, the glides described in the prior art generally describe automatic levelling devices, such as in U.S. Pat. No. 3,080,601, or glides that allow the bottom surface of the glide to remain parallel to the floor surface while the leg of the furniture rotates, such as in U.S. Pat. No. 1,332,605.

These patents do not provide for the changing of the exposed portion of the leg from a glide to a caster to enable either stationary or rollable movement, nor do they provide for an aesthetically pleasing appearance in either mode.

BRIEF DESCRIPTION OF THE DRAWINGS

FIG. 1 is a perspective view of Applicant's furniture support.

FIG. 2 is an exploded perspective view of this support.

FIG. 3 shows a detail of Applicant's furniture support with the glide in the storage position.

FIG. 4 shows the bottom portion of Applicant's furniture support with the glide in the exposed position.

FIG. 5 is a detail of a glide.

DESCRIPTION OF THE PREFERRED EMBODIMENT

Referring now to the drawings in detail, there is shown in FIGS. 1 and 2 a furniture leg or support 1 comprising a top plate 5, a columnar section 10 and a bottom foot 15. The top plate 5 is generally fastened to the underside of the article of furniture 2 by a standard fastening means such as screws. When the article of furniture 2 is a table, as in one preferred embodiment, the edge trim of the table can be constructed so that its cross-section reflects the shape of the foot casting to create an aesthetically pleasing appearance. The columnar section 10 comprises a metal tube 20 that is welded or otherwise secured to the top plate 5 near its uppermost end 21 and is cut at a desired length depending on how high (L) it is desired for the article of furniture to be above the ground.

In the preferred embodiment, a hollow cylindrical foam sleeve 25, preferably made of urethane, neoprene, rubber foam or other resilient material is slid over the column 20 to protect human legs and other furniture from hitting the hard metal tube 20. This foam sleeve is essentially the same length as the length of the column from the bottom of the top plate 5 to its bottom end 22. Preferably, the foam sleeve 25 is loosely fit over the metal tube 20 so that when glancing blows are struck on the sleeve, it may rotate rather than being punctured or lacerated. This foam sleeve 25 may also be easily changed with one of a different color, density or material by simply unscrewing the shroud means or foot casting 30, sliding the foam sleeve off of the metal tube, sliding a new sleeve 25 on and replacing the foot casting 30. In another embodiment, the metal tube 20 is merely painted on its exterior 23 and the foam sleeve is not included.

Attached to the bottom portion of the column is the shroud means 30 which is an annular metal casting with exterior sloped walls 31 and lower depending vertical walls 32. The outer diameter of the lower vertical walls 32 is sufficiently large to enable a caster 50 to swivel around a vertical axis inside the walls. The distance from the center of the axis of rotation of the caster around this vertical axis to the outside tip of the wheel is defined as the swivel radius (R) and twice that distance is defined as the swivel diameter (D). The top of the foot casting is essentially horizontal through a portion of the cross section 33. At the outer diameter of the horizontal section are upper 34 and lower 35 sloping sections of the exterior sloped walls. The upper sloping section 34 extends upward from the horizontal section 33. The topmost point 36 of this upper sloping section 34 is approximately the same diameter as the outside diameter of the foam sleeve 25 so that their junction is smooth and pleasing to the eye when the foot casting is screwed onto the column. If no foam sleeve is used, the upper sloping section 34 of the shroud means or foot casting 30 is then altered to taper to the metal tube 20 so that an aesthetically pleasing assembly is created in this embodiment.

Attached at the inside diameter of the horizontal section 33 is an upstanding cylindrical post 40, and on the upper exterior surface of the post are threads 42.

Near the bottom 22 of the column 10 are machined threads 24 on the interior. In the preferred embodiment wherein the column 10 is composed of a hollow tube 20, welded into the interior of the metal tube 20, near the bottom portion 22 is a nut 27 with interior threads 24. These threads 24 co-act with the top exterior threads 42 of the post 40 of the foot casting 30 so that the foot casting can be screwed onto the steel tube 20. The snugness of the fit between the threads is such that the shroud or foot casting 30 can preferably be screwed by hand. The threads also allow for the shroud 30 to be screwed or unscrewed slightly to allow for adjustment in the total length (L) of the entire leg assembly to allow for an easy means of levelling the top surface 3 of the article of furniture 2. This can be accomplished when either the caster 50 or the glide 70 is exposed to the floor surface 4. Moreover, the wide diameter of the foot casting 30 allows the user to obtain sufficient torque on the shroud 30 by grasping it by hand and turning it so that the article of furniture 2 can be levelled without removing the weight of the furniture 2 from the leg 1.

The foam sleeve 25 encasing the metal tube can also be easily changed by unscrewing the shroud or foot casting 30, sliding off the foam sleeve along the column, replacing the sleeve and screwing on the shroud.

It should be noted that the upper sloped section 34 of the foot casting 30 extends part way up the foam sleeve 25 so that when minor levelling adjustments are made, there is no gap created along the exterior of the junction between the foam sleeve 25 and the shroud 30. Thus, the exterior surface appears to remain unitary, and an aesthetically pleasing appearance is maintained even when the shroud or foot casting 30 is not screwed entirely into the threads 24 at the bottom of the tube 20 and the top surface 38 of the horizontal section 33 of the foot casting 30 is not in contact with the bottom 22 of the metal tube 20.

However, preferably, the shroud 30 is screwed sufficiently into the nut such that the top surface 38 of the horizontal section 3 of the shroud means or foot casting 30 is in contact with the bottom 22 of the metal tube 20 when the article of furniture 2 is on a level ground surface 4.

The inside diameter of the upstanding cylindrical post 40 of the shroud 30 is a hollow shaft 45. The diameter 46 of this shaft is manufactured to a close tolerance so that it snugly accepts the upstanding center post 55 of a swivel caster 50.

In the preferred embodiment the swivel caster 50 is a Bassick W95DC6CB-X691 swivel caster with a 23/16" diameter soft wheel offset slightly, so that the caster has a 4⅛" of the caster 50 is further held in friction engagement with the interior of the shaft 45 of the shroud 30 by an expandable ring 57 fit in a slot 56 near the top of the center post 55. Thus, the caster 50 is able to be removed from the shroud 30 by grasping the caster 50 and pulling it, preferably by hand. However, the tolerances of the inside diameter 46 of the shaft 45 and the outside diameter 58 of the post plus the expandable ring 57 will create enough friction to keep the caster in place in the shaft if the piece of furniture 2 is merely lifted off the ground 4 and no tugging force is applied to the caster 50.

Fitted into the bell-shaped portion of the foot casting is a cup-shaped glide 70 preferably made of plastic or fiberglas. As will be explained later, this glide 70 can fit into the foot casting 30 with either the open 75 or closed 77 end uppermost in the foot casting.

In the preferred embodiment, the lower sloped section 35 and the vertical depending wall 32 of the shroud means or foot casting 30 are of sufficient length that when the glide 70 is fitted with the closed end 77 uppermost into the foot casting 30, the glide 70 is completely shielded when viewed from above or the side. However, an embodiment in which the glide 70 has portions exposed to view while in this position remains well within the spirit of the invention.

As seen in FIG. 5, the glide is constructed with a hole 78 in the center of the closed end 77. The diameter of this hole should be sufficiently large to place human appendage such as a finger in the hole, but small enough that the bottom of the wheel 51 of the caster 50 does not interfere with the hole 78. In a preferred embodiment this hole 78 is approximately ¾" in diameter (or ⅜" radius) and the center line of the wheel 51 of the caster is offset approximately 27/32" from the center line of the leg so that the there is an annulus of glide material creating a glide surface 79 approximately 15/32" wide around the edge of the hole 78 of the glide between the hole and the center line of the bottom of the caster wheel 51.

The glide also contains two small holes 71 in the curved section 73. They are positioned so that a pointed object, such as a screwdriver (not shown), can be inserted into the holes 71 and used to pry against the foot casting 30 for removal of the glide from the casting when the glide is in the closed down position. There is also a vertical slot 72 cut into the vertical wall 74 of the glide near the open end 75 of the glide. This allows the upper portion of the vertical wall 74 of the glide to deflect slightly to obtain a snug fit with the inside surface 39 of the vertical wall 42 of the foot casting when the glide is placed into the shroud 30 with the closed end down position.

As seen in FIG. 3, in one embodiment the bottom surface 52 of the caster wheel 51 is in contact with the floor or ground 4. In this embodiment, the glide 70 is stored within the shroud or foot casting 30, above the caster 50. The glide 70 is kept in place by being positioned between the shoulder 59 of the caster post 55 and the bottom surface 43 of the horizontal section 33 of the foot casting.

The diameter 78 of the glide at the open end is slightly larger than the swivel diameter so that the open end does not interfere with the caster in either position. This embodiment discloses a leg 1 that allows strong support for a piece of furniture and allows for movability of that furniture on the roller or wheel 51 of the caster 50. Moreover, the caster 50 is hidden from the view of the average user of the furniture by the foot casting 30, thus, creating an aesthetically pleasing table leg. Moreover, the caster 50 is protected from physical abuse by being shielded around its top and sides by the shroud 30.

If it is desired that the furniture not be readily movable, the glide can be removed from the above-described stored position in the following manner. First, the weight of the furniture 2 is removed from the caster 50 such as by inverting the table. Then the caster 50 can be removed from the end of the leg 15 by merely grasping the caster and pulling it out of the frictional fit in the shaft 45 of the foot casting or shroud means as described earlier. At this point, a human's thumbs can contact the inside surfaces of the longitudinal walls 74 of the glide and the glide 70 can then be pulled free of its position inside the foot casting.

The foot casting is molded so that there is a slight taper or draft in the inside surface 39 of the vertical walls 32 of the foot casting or shroud means. This makes the inside diameter of the lower longitudinal walls slightly larger at the bottom end than at the top end of the vertical walls 32. In addition, the glide is molded so that there is a slight taper or draft in its longitudinal walls 74, and the outside diameter of the vertical walls near the open end is slightly larger than the outside diameter near the curved portion 73.

With these cooperating tapers, the glide 70 fits very snugly into the shroud means 30 when the glide is placed with its open end upmost into the shroud means, and the longitudinal 72 slots allow for slight deflection in the glide's side walls 74. However, the glide fits loosely into the shroud means when the glide is in the storge position, or placed with the open end facing down and is held in place by the shoulder of the caster as described earlier.

Attention is now drawn to FIG. 4 which shows the embodiment of the table leg with the glide surface 79 of the glide 70 being exposed to the floor surface since the glide is inverted.

Once the glide has been removed from its storage position, as in FIG. 3, the embodiment shown in FIG. 4 can be easily constructed by reinserting the caster center post 55 into the shaft 45 of the foot casting. It can be seen that the shoulder portion 59 of the center post 55 now rests against the bottom surface 43 of the top horizontal section 33 of the foot casting 30 and the glide is inverted so that the open portion 75 of the glide is initially placed into the shroud or foot casting 30.

The bottom surface 81 of the open portion 75 of the glide 70 then rests against the shoulder abutment 29 of the shroud 30. The bottom surface 52 of the wheel 51 on the caster also rests against the inside surface of the interior portion of the glide surface 79 around the hole 78. The glide is held in place by being slightly compressed around the top of the open end 75 which is allowed by the longitudinal slots 72 as described earlier.

As can be seen, the length (L) of the entire table leg assembly 1 remains the same since the thickness of the glide is taken into account in the total length of the leg assembly 1 in both embodiments.

If it is desired that the foot assembly 15 be altered again to have the caster 50 exposed to the floor surface 4, this can be readily accomplished by dismantling and reassembling the foot assembly in the opposite manner described above to end up with an embodiment as shown in FIG. 3. Since the total length (L) of the leg remains the same when either the glide is exposed or when it is in the stored position, a user can choose between a table which is fully mobile (all casters exposed), or partially mobile (a combination of casters and glides being exposed) or fully fixed (in which all glides are exposed). A partially mobile table of four legs can be moved if 2 legs with casters are adjacent and the side of the table opposite the two exposed casters is lifted off the floor and a horizontal force is then applied to the table to roll it along the ground 4. Moreover, each leg of the table can be readily and simply converted from movable (caster exposed) to fixed (glide exposed) construction without the need to reorder special parts or hire skilled furniture craftsmen.

Having shown and described two descriptions of a preferred embodiment of the invention, by way of example, it should be realized that structural changes could be made and other examples given without departing from either the spirit or the scope of this invention.

What I claim is:

1. A support for positioning an article of furniture above ground comprising:
   a. a column depending downwardly from the article of furniture, said column having a bottom portion;
   b. a caster removably secured to the bottom of the column in ground contacting position;
   c. a shroud providing a semi-circular portion removably attached to the bottom of the column and encircling said caster above ground; and
   d. a caster glide having means for a first stored position beneath said column within said shroud encircling said caster above the ground, and honing means for a second position partially removed from said shroud and encircling said caster and interposed between said caster and the ground.

2. A support for positioning an article of furniture above ground as defined by claim 1 wherein said caster glide is semi-circular in configuration providing an open end and a closed end.

3. A support for positioning an article of furniture above ground as defined by claim 1 wherein said caster glide provides an inside diameter at its open end slightly larger than the swivel diameter of said caster when it is secured to the bottom of the column.

4. A support for positioning an article of furniture above ground as defined by claim 1 wherein said shroud provides lower depending walls that substantially cover the glide when the glide is in its first stored position, with said depending walls providing an internal shoulder for limiting the insertion of said caster glide therein when said caster glide is in its second position partially removed from said shroud.

* * * * *